US006887173B2

United States Patent
Lacroix et al.

(10) Patent No.: US 6,887,173 B2
(45) Date of Patent: May 3, 2005

(54) INFLATABLE ARTICLES WITH SELF-CONTAINED INFLATION MECHANISM

(75) Inventors: Matthew K. Lacroix, Granby, MA (US); Terence Melvin, Ormond Beach, FL (US); Daniel P. Touhey, South Hadley, MA (US); Brian P. Feeney, East Windsor, CT (US); Joseph E. Stahl, Southhampton, MA (US); Neil T. Amundsen, Minneapolis, MN (US); Louis F. Polk, III, Excelsior, MN (US); Joseph J. Schachtner, Deer Park, WI (US); Kenneth V. Schomburg, Wayzata, MN (US); George D. Stickler, Shorewood, MN (US)

(73) Assignee: Russell Asset Management, Inc., Wilmington, DE (US)

( * ) Notice: Subject to any disclaimer, the term of this patent is extended or adjusted under 35 U.S.C. 154(b) by 0 days.

(21) Appl. No.: 10/210,436

(22) Filed: Aug. 1, 2002

(65) Prior Publication Data

US 2003/0032507 A1 Feb. 13, 2003

Related U.S. Application Data

(63) Continuation-in-part of application No. 10/183,337, filed on Jun. 25, 2002, now Pat. No. 6,702,699, which is a continuation of application No. 09/594,980, filed on Jun. 15, 2000, now Pat. No. 6,409,618, which is a continuation-in-part of application No. 09/478,225, filed on Jan. 6, 2000, now Pat. No. 6,287,225.

(60) Provisional application No. 60/309,665, filed on Aug. 2, 2001, and provisional application No. 60/159,311, filed on Oct. 14, 1999.

(51) Int. Cl.[7] .............................................. A63B 41/12
(52) U.S. Cl. ...................................................... 473/593
(58) Field of Search ................................ 473/593, 610, 473/611; 446/220; 417/478–480, 289, 305; 36/29; 5/708; 293/102, 107, 108

(56) References Cited

U.S. PATENT DOCUMENTS

| 362,532 A | 5/1887 | Patterson |
| 602,294 A | 4/1898 | Arnold |

(Continued)

FOREIGN PATENT DOCUMENTS

WO     WO 93/18826     9/1993

*Primary Examiner*—Steven Wong

(57) ABSTRACT

Inflatable articles with self-contained mechanisms, such as sporting equipment, medical equipment, recreational devices and toys, preferably any inflatable article with at least one mechanism for inflating or adding pressure to the article, or for deflating or removing pressure from the piece of equipment, such that the mechanism is located inside the article are disclosed.

13 Claims, 18 Drawing Sheets

U.S. PATENT DOCUMENTS

| | | | |
|---|---|---|---|
| 1,527,004 A * | 2/1925 | Nellis | 473/603 |
| 1,723,855 A * | 8/1929 | Henry | 473/603 |
| 2,625,770 A | 1/1953 | Steen et al. | |
| 2,698,028 A | 12/1954 | Lee et al. | |
| 2,737,969 A | 3/1956 | Iknayan | |
| 3,020,673 A | 2/1962 | Cooke | |
| 3,068,494 A * | 12/1962 | Pinkwater | 5/708 |
| 3,119,617 A | 1/1964 | Topper | |
| 3,133,696 A * | 5/1964 | Mirando | 5/708 |
| 3,155,991 A * | 11/1964 | Dunham | 5/708 |
| 3,229,976 A | 1/1966 | Allen, Jr. | |
| 4,568,081 A | 2/1986 | Martin | |
| 4,595,200 A | 6/1986 | Shishido | |
| 4,776,589 A | 10/1988 | Yang | |
| 4,842,563 A | 6/1989 | Russell | |
| 4,862,533 A | 9/1989 | Adams, III | |
| 4,975,028 A | 12/1990 | Schultz | |
| 5,068,933 A | 12/1991 | Sexton | |
| 5,098,095 A | 3/1992 | Weiss | |
| 5,098,329 A | 3/1992 | Tseng | |
| 5,102,365 A | 4/1992 | Wang | |
| 5,219,162 A | 6/1993 | Orbanes et al. | |
| 5,238,244 A | 8/1993 | Cotter et al. | |
| 5,375,839 A | 12/1994 | Pagani | |
| 5,494,410 A | 2/1996 | Maier-Laxhuber et al. | |
| 5,500,965 A | 3/1996 | Hannagan et al. | |
| 5,603,131 A | 2/1997 | DeJean, Jr. | |
| 5,755,634 A | 5/1998 | Huang | |
| 5,827,052 A * | 10/1998 | Wang | 417/472 |
| 6,287,225 B1 | 9/2001 | Touhey et al. | |
| 6,409,618 B1 | 6/2002 | Touhey et al. | |
| 6,422,960 B1 | 7/2002 | Touhey et al. | |
| 6,450,906 B1 | 9/2002 | Touhey et al. | |
| 6,491,595 B1 * | 12/2002 | Feeney et al. | 473/593 |
| 6,702,699 B2 * | 3/2004 | Touhey et al. | 473/593 |

* cited by examiner

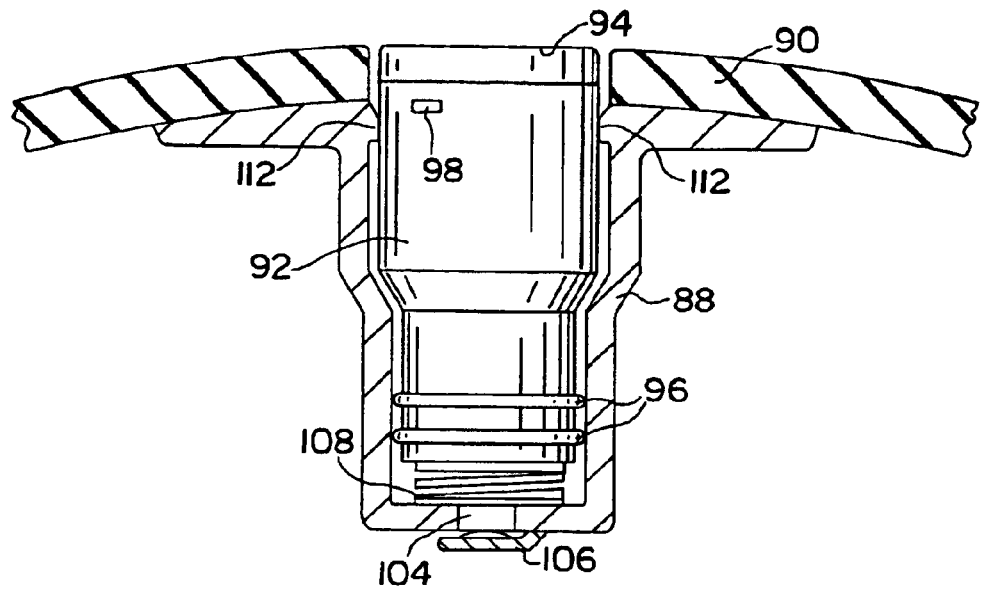
FIG. 7
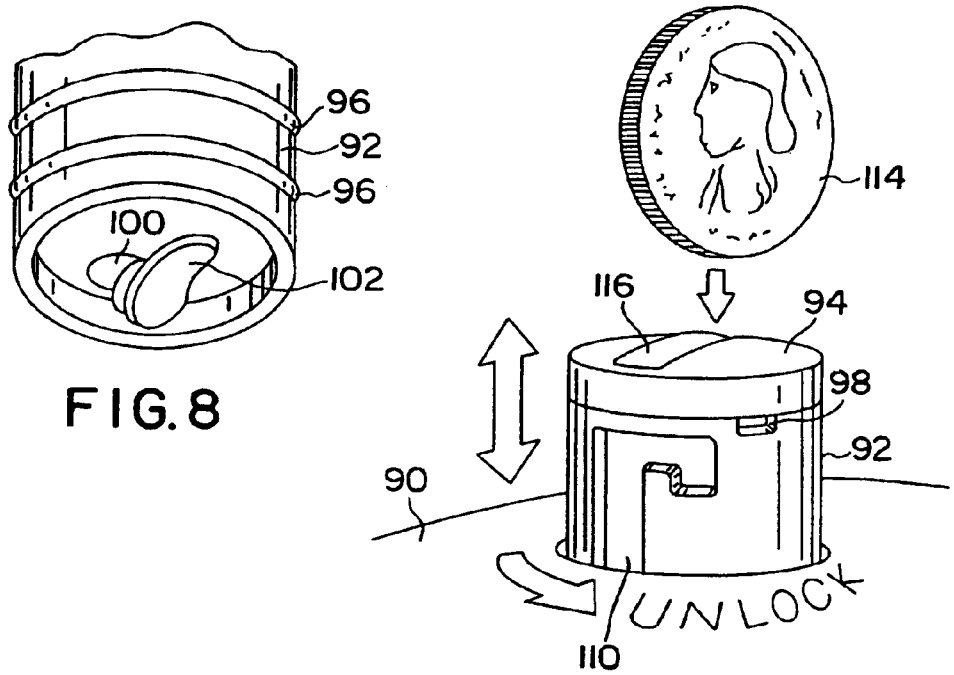
FIG. 8
FIG. 9

INFLATABLE ARTICLES WITH SELF-CONTAINED INFLATION MECHANISM

CROSS REFERENCE TO RELATED APPLICATIONS

This application is a continuation-in-part of U.S. application Ser. No. 10/183,337, filed Jun. 25, 2002, now U.S. Pat. No. 6,702,699, which is a continuation of U.S. application Ser. No. 09/594,980, filed Jun. 15, 2000 now U.S. Pat. No. 6,409,618, which is a continuation-in-part of U.S. application Ser. No. 09/478,225, filed Jan. 6, 2000, now U.S. Pat. No. 6,287,225, which claims the benefit of and U.S. Provisional Application No. 60/159,311, filed Oct. 14, 1999. This application also claims the benefit of U.S. Provisional Application No. 60/309,665, filed Aug. 2, 2001.

FIELD OF THE INVENTION

The present invention relates to inflatable articles with self-contained mechanisms, such as sporting equipment, leisure equipment, medical equipment, and toys, preferably any inflatable article with at least one mechanism for inflating or adding pressure to the article, or for deflating or removing pressure from the piece of equipment, such that the mechanism is located inside the article.

BACKGROUND OF THE INVENTION

The present invention relates to any inflatable article that contains at least one mechanism for inflating or adding pressure to the article, or for deflating or removing pressure from the article. The mechanism for inflating or deflating the article is preferably a pump. Examples of articles that may contain an inflation or deflation mechanism(s) include, but are not limited to, any article which has a bladder or other layer which is impermeable such that air is retained in the article, such as tires and inner tubes for bicycles and other vehicles; inflatable rafts and boats; bumpers or fenders for boats; baffles; air mattresses; pillows; pool toys such as balls, rafts, rings, animals; beach balls; inflatable chairs; punching bags; swimming aids and flotation devices; pogo balls; balloons; medical equipment such as inflatable casts and splints; reusable packing materials; cushions and seats for cars, bikes and other vehicles; and the like.

Articles such as those described above are generally inflated through a traditional inflation valve using a separate inflation needle that is inserted into and through a self-sealing inflation valve, or by blowing or forcing air into an inflation valve that is then closed. A separate pump, such as a traditional bicycle pump or air compressor, is connected to the inflation needle and the article is inflated using the pump. The inflation needle is then withdrawn from the inflation valve that generally and preferably self-seals to maintain the pressure. The inflation valve may also be manually sealed. This system works fine until the article needs inflation or a pressure increase or decrease and a needle and/or pump are not readily available.

Alternatively, some articles such as beach balls, pool toys, air mattresses and the like, have manual inflation valves which generally require a person to manually blow air into the valve until the article is fully inflated, or they have valves which allow the use of an air compressor or foot pump to force air into the valve. Often, when inflating a large object by blowing air into it, inflation takes a considerable amount of time because it is easy to become light headed if inflating an object too quickly. Alternatively, if an air compressor or foot pump is used, electricity or batteries may be needed, and this may not be readily available.

There is a need for a self-contained inflation mechanism or mechanisms in many inflatable articles and pieces of equipment.

SUMMARY OF THE INVENTION

The present invention relates to any inflatable article that contains a mechanism or multiple mechanisms, preferably a pump, for inflating or adding pressure to the article, or for deflating or removing pressure from the article. The mechanism, or pump, is operable from outside the article, and it pumps ambient air into the article to achieve the desired pressure. The inflation mechanism provides a chamber within the article with means for admitting ambient air into the chamber. The article having the inflation mechanism(s) conforms to the same specifications as a corresponding article that does not contain the inflation mechanism(s). The present invention achieves the above-noted objectives.

Other objects will be in part obvious and in part pointed out more in detail hereafter.

In a first aspect, the present invention provides an inflatable article comprising at least one internal pump, wherein the at least one pump includes means for actuating the pump. The pump additionally includes means for pumping ambient air into the article and means for preventing the pumped air from escaping out of the article. The pump is essentially flush with or slightly below the surface of the article when not in use.

In another aspect, the present invention provides an inflatable article comprising an internal pump, wherein the pump includes a cylinder having an air outlet into said article, a one-way valve attached to said air outlet permitting air flow from said cylinder into said article and preventing air flow from said article back into said cylinder. The pump also includes means in the cylinder operable to draw ambient air from outside said article into the cylinder and to force the drawn ambient air from the cylinder through the one-way valve into the article. The pump further includes means for actuating the pump from outside the article.

The invention accordingly comprises the several steps and the relation of one or more of such steps with respect to each of the others and the articles possessing the features, properties, and the relation of elements exemplified in the following detailed disclosure.

BRIEF DESCRIPTION OF THE DRAWINGS

The following is a brief description of the drawings, which are presented for the purposes of illustrating the invention and not for the purposes of limiting the same. The attached figures show different embodiments of inflation mechanisms of the present invention, and some of the inflation mechanisms are shown mounted in an article.

FIGS. 7, 8 and 9 illustrate another embodiment of the invention employing a different piston and cylinder arrangement.

DETAILED DESCRIPTION OF THE PREFERRED EMBODIMENTS

Figure 1:
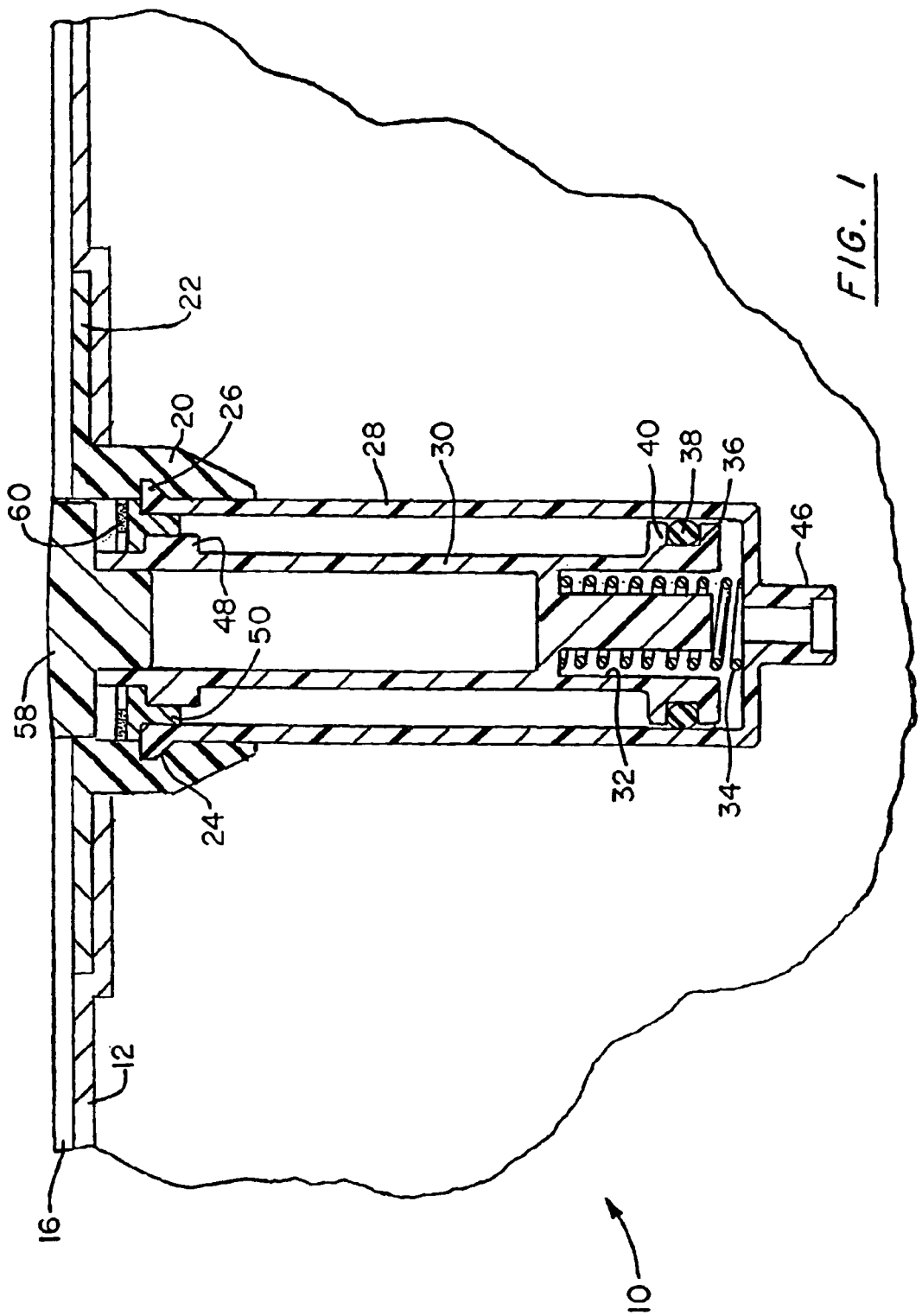
FIG. 1 shows a cross-section of a portion of an inflatable article with a self-contained piston and cylinder arrangement operable from outside the article for adding air pressure to the article.

In a preferred embodiment, the article is an inflatable article with at least one self-contained inflation mechanism or other internal device. The article preferably contains a bladder or is made of a material that retains or holds air. The interior of the article may also contain baffles and/or a foamed material in part. The article may be any article which has a bladder or other layer which is impermeable such that air is retained in the article, such as tires and inner tubes for bicycles and other vehicles; inflatable rafts and boats; bumpers or fenders for boats; baffles; air mattresses; pillows; pool toys such as balls, rafts, rings, animals; beach balls; inflatable chairs; punching bags; swimming aids and flotation devices; pogo balls; balloons; and the like, and it is preferably a recreational device, a piece of sports equipment, or a medical device with at least one self-contained inflation mechanism or other internal device, more preferably a preferably a recreational device, medical device or a piece of sports equipment with at least one self-contained inflation mechanism such as a pump.

In one preferred embodiment, the article is constructed of a material that restricts the article from expanding to any significant extent beyond its desired size and pressure. As previously described, the article may contain multiple layers such as a bladder or inner layer and an outer layer of the same or a different material, or the article may comprise a single layer.

In another preferred embodiment, the article is constructed of a single layer or ply of material. The material may be any material suitable for use on an inflatable article, depending on the desired conditions. For example, a thin, lightweight vinyl material may be used for inflatable rafts and pool toys, while a stronger material such as rubber, canvas, plastic, vinyl, elastomer, latex, urethane, or combinations thereof, or other suitable flexible material may be used for articles that must be more durable in nature.

The inflation mechanism may be mounted in the article in any suitable way known in the art, such as bonding the mechanism to the article, laminating the pump into the article, and the like. Several different types of pumps have been described for use in different types of articles.

The inflation mechanism is preferably small and light weight so that excessive weight is not added to the article. Depending on the size and weight of the article, a larger pump may be used if desired. A larger pump may pump larger volumes of air more quickly. The pump described herein may be scaled up to a larger size as long as it does not affect the functionality of the article. Additionally, for some articles and applications, it may be desirable to add a weight to the article to counterbalance the inflation mechanism if balance is an important quality of the article. For other articles, such as a large boat bumper or fender, the article may be large enough and heavy enough and the pump light enough, or balance is not an issue, so it may not be necessary or desirable to counterbalance the pump. The inflation mechanism is preferably made from a plastic material such as polystyrene or polycarbonate, but any material or combination of materials known in the art may be used.

Multiple inflation mechanisms may be incorporated into a single article if desirable. For example, for articles such as air mattresses, inflatable rafts, boat bumpers, splints or air casts, seats, and the like, the article may have multiple separate air chambers, and each chamber may have a separate inflation mechanism to maintain pressure within the chamber. Alternatively, multiple inflation mechanisms may be incorporated into a single article having only one chamber, to provide additional inflation power and/or a backup inflation mechanism. In some articles, such as a boat bumper or fender, multiple inflation mechanisms may be useful, and the inflation mechanisms may be located at opposite ends of the article for ease of operation.

Figure 11:
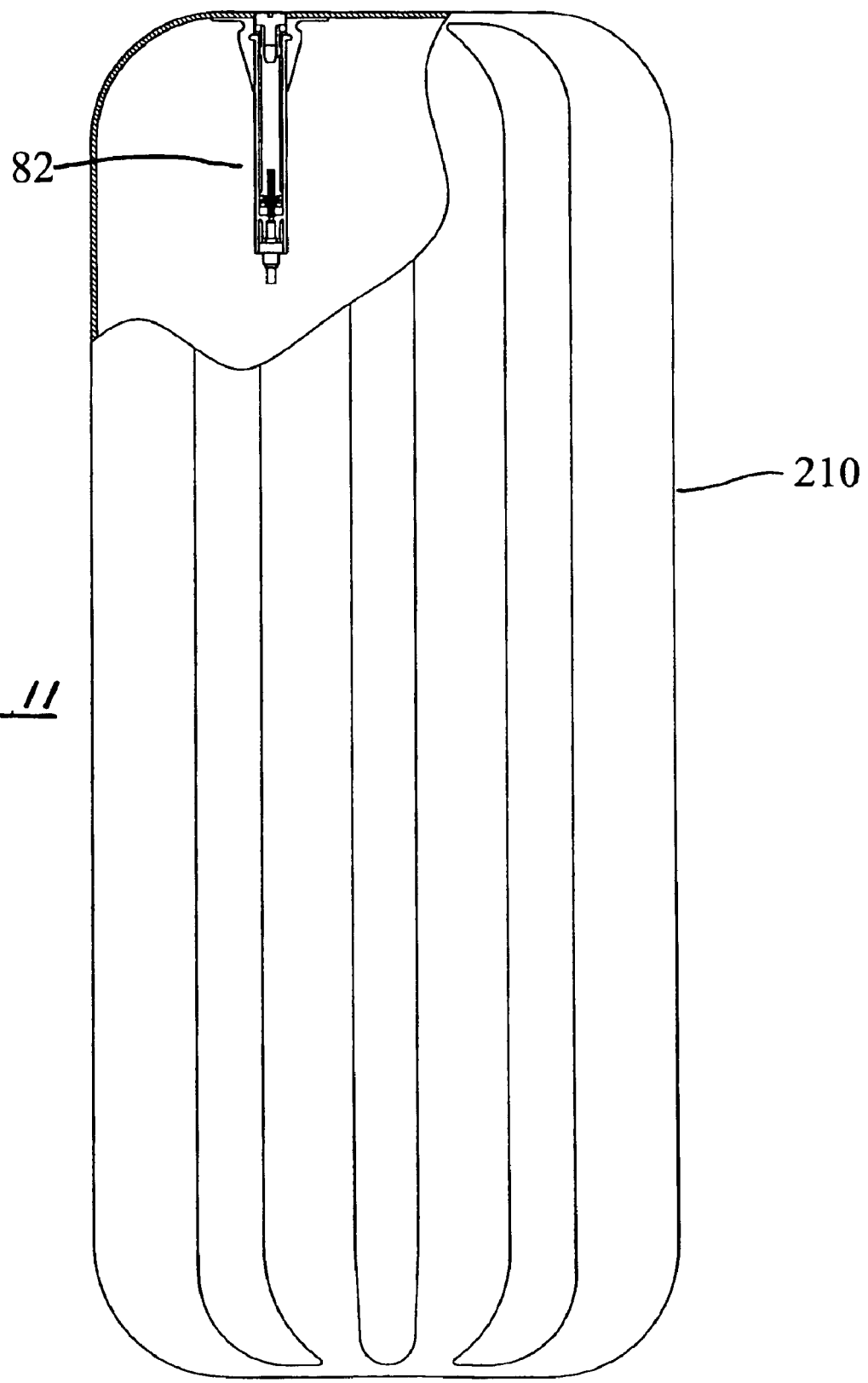
FIG. 11 illustrates a boat bumper or fender of the invention with an internal inflation pump.

Referring first to FIGS. 1 to 5 of the drawings, one embodiment of the invention illustrating a portion of an article 10 an inflation pump is shown. The article that is illustrated is a multi-layer article, such as a boat bumper or fender, where the construction comprises an inner layer 12 for air retention, and an outer layer 16. The inner and/or outer layer preferably comprises a material which cannot be extended to any significant degree and which restricts the article from expanding to any significant extent above its desired size when inflated above its normal desired pressure. Alternatively, the article may be constructed of multiple layers of a durable material such as rubber, canvas, vinyl and the like, and one or more layers may be impregnated or coated with a waterproof and/or cut-proof material. The article may alternatively comprise only one layer of material if desired, as long as the material is such that it will retain air. FIG. 11 shows a boat bumper or fender 210 of the invention that has an internal inflation pump 82.

Incorporated into the article of the invention during formation is the rubber pump boot or housing 20 with a central opening and with a flange 22 which is bonded to the article, preferably using a rubber adhesive. The boot is preferably located between the inner layer 12 and the outer layer 16. The boot 20 may be constructed of any suitable material, such as butyl rubber, natural rubber, urethane rubber, or any suitable elastomer or rubber material known in the art, or combinations thereof. The boot is preferably constructed of a material that will bond or adhere to the material of the article more readily. For example, if the inner layer of the article is butyl rubber, a butyl rubber boot is preferred as it is compatible and will bond more easily than some other materials.

A molding plug may be inserted into the boot opening during the molding process to maintain the proper shape central opening and to allow the article to be inflated during the manufacturing process. The molding plug is preferably aluminum, composite or rubber, most preferably aluminum. The central opening through the boot 20 is configured with a groove 24 to hold the flange 26 on the upper end of the pump cylinder 28. The cylinder can optionally be bonded to the boot using any suitable flexible adhesive (epoxy, urethane, cyanoacrylate, or any other flexible adhesive known in the art). The pump cylinder shown is a right cylinder, but other cylinders that are not right cylinders, such as a cylinder having a non-circular cross-section, may be used.

Figure 2:
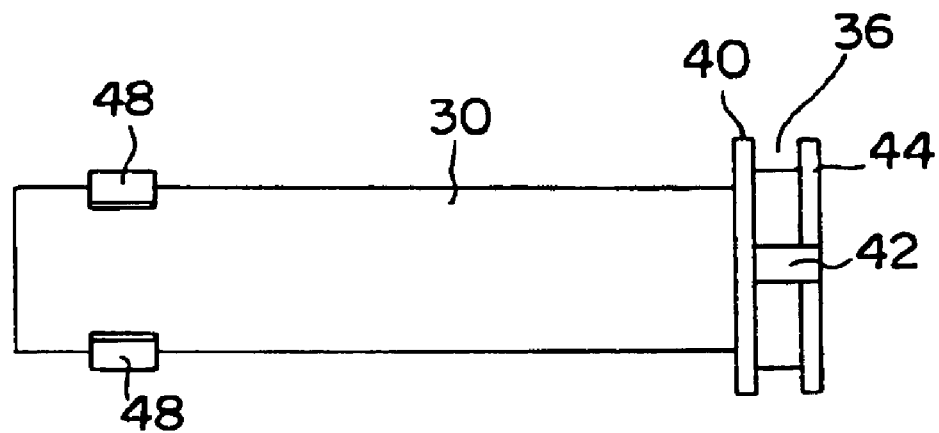
FIG. 2 is a side view of the piston shown in FIG. 1.

Located in the pump cylinder 28 is the pump piston 30 that is illustrated in both FIGS. 1 and 2. The piston includes a circular groove 32 at the bottom end that contains the spring 34 that forces the piston up in the cylinder 28. Also at the bottom end of the piston 30 is an O-ring groove 36 containing the O-ring 38. As seen in FIG. 1, this O-ring groove 36 is dimensioned such that the O-ring 38 can move up and down in the groove 36. The O-ring is forced into the position shown in FIG. 1 when the piston 30 is pushed down. In this position, the O-ring seals between the cylinder wall and the upper flange 40 of the groove 36. As shown in FIG. 2, there are recesses or slots 42 in the groove 36 extending from just below the upper flange 40 down through the lower flange 44. Only one of these slots 42 is shown in FIG. 2 but there are preferably two or more. When the piston 30 is forced up by the spring 34, the O-ring 38 moves to the bottom of the groove 36 which opens up a by-pass around the O-ring through the recesses 42 so that the air can enter the cylinder 28 below the piston 30. Then, when the piston is pushed down, the O-ring moves back up to the top of the groove and seals to force the air out through the cylinder exit nozzle 46.

Figure 3:
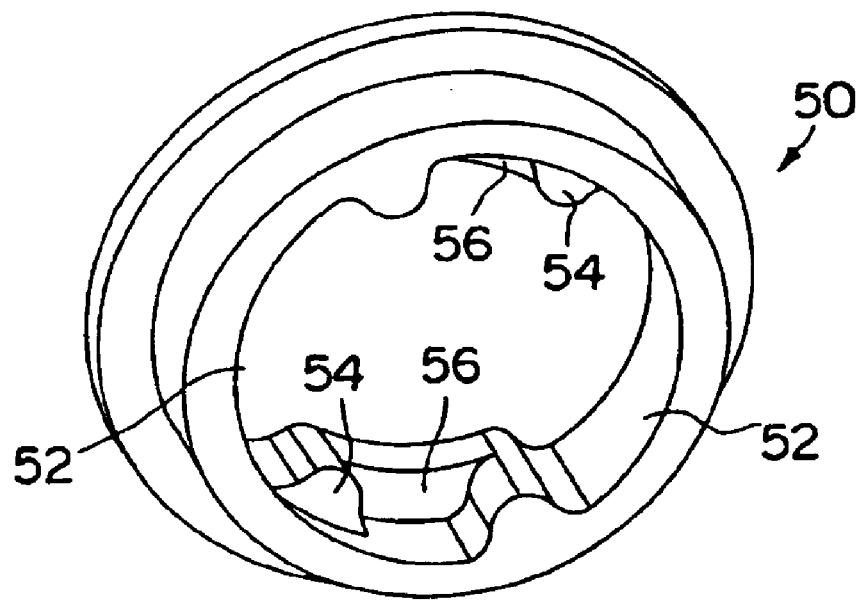
FIG. 3 is an isometric view of the cap for the pump of FIG. 1 showing the configuration for locking and unlocking the pump piston.

At the upper end of the piston are the two flanges 48 that cooperate with the cylinder cap 50 to hold the piston down in the cylinder and to release the piston for pumping. The cylinder cap 50 is fixed into the top of the cylinder 28 and the piston 30 extends through the center of the cylinder cap. The cap is cemented into the cylinder using a suitable adhesive known in the art. FIG. 3 shows an isometric view of the bottom of the cylinder cap 50 and illustrates the open areas 52 on opposite sides of the central opening through which the two flanges 48 on the piston can pass in the unlocked position. In the locked position, the piston is pushed down and rotated such that the two flanges 48 pass under the projections 54 and are rotated into the locking recesses 56. Attached to the upper end of the piston 30 is a button or cap 58 which is designed to essentially completely fill the hole in the carcass and to be essentially flush with or slightly recessed below the surface of the article. Examples of materials suitable for use as the button or cap 58 include urethane rubber, butyl rubber, natural rubber or any other material known in the art. A preferred rubber for use as the button or cap is a thermoplastic vulcanizate such as Santoprene™ rubber, available from Advanced Elastomer Systems, Akron Ohio. The button or cap may also be flexible to match the feel of the rest of the article. If desirable, the surface of the button may be textured to increase grip and make it easier to operate the pump. Optionally mounted on the upper surface of the cylinder cap 50 is a pad 60 that is engaged by the button 58 when the piston is pushed down against the spring force to lock or unlock the piston. The pad 60 provides cushioning to the pump.

In a preferred embodiment, fibers or other reinforcing materials may be incorporated during mixing into the rubber compound or thermoplastic material used for the button or cap. Examples of fibers materials suitable for use include, but are not limited to, polyester, polyamide, polypropylene, Kevlar™, cellulistic, glass and combinations thereof. Incorporation of fibers or other reinforcing materials into the button or cap improves the durability of the button and improves the union of the button or cap and the piston rod, thus preventing the button or cap from shearing off during use. Although the pump would still function without the button, it becomes very difficult to use.

In one preferred embodiment, the button or cap 58 may be co-injected with the piston 30 as one part. Alternatively, the button or cap 58 may be co-injected with a connecting piece, and the button or cap 58 and connecting piece may then be attached to the upper end of the piston 30 using an adhesive suitable for bonding the two pieces together. Co-injecting the button 58 and the piston 30 as one part, or alternatively, the button 58 and the connecting piece as one part that is mounted to the piston, provides a more durable part that is less likely to break or come apart during routine use of the ball. The button or cap material and the piston material need to be selected such that the two materials will adhere when co-injected. Testing of various combinations has shown that co-injecting or extruding a soft rubber button, such as a button comprising Santoprene™, and a harder piston, such as polycarbonate or polypropylene and the like, provides a durable bond without the need for adhesives.

The piston and the connecting piece may be formed of any suitable material, such as, but not limited to, polycarbonate (PC), polystyrene (PS), acrylic (PMMA), acrylonitrile-styrene acrylate (ASA), polyethylene terephthalate (PET), acrylonitrilebutadiene styrene (ABS) copolymer, ABS/PC blends, polypropylene (preferably high impact polypropylene), polyphenylene oxide, nylon, combinations thereof, or any suitable material known in the art. Materials with high impact strength are preferred.

Figure 4:
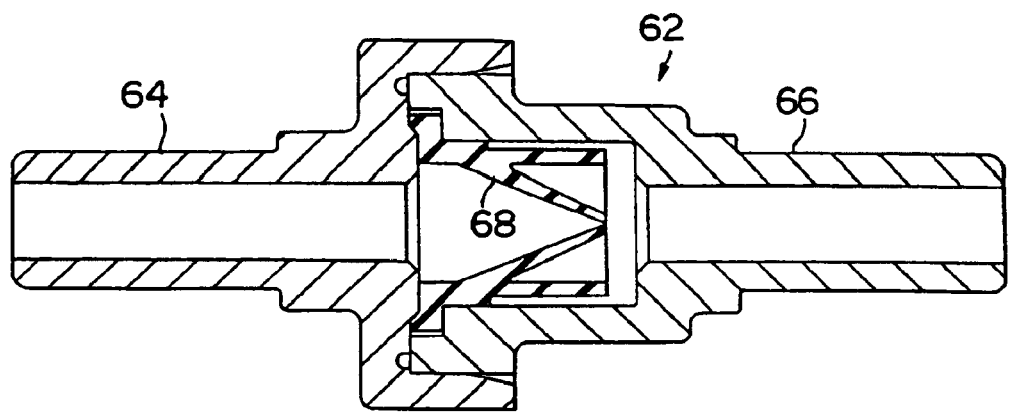
FIG. 4 is a detailed cross-section view of a one-way valve assembly for use on the exit of the pump of FIG. 1.

FIG. 1 of the drawings shows a pump exit nozzle 46 but does not show the one way valve that is attached to this exit. Shown in FIG. 4 is a one-way valve assembly 62 of the duckbill-type to be mounted in the exit nozzle 46. This assembly comprises an inlet end piece 64, an outlet end piece 66 and an elastomeric duckbill valve 68 captured between the two end pieces. The end pieces 64 and 66 are preferably plastic, such as polycarbonate, polypropylene, nylon, polyethylene, or combinations thereof, but may be any material suitable for use, and they may be ultrasonically welded together. Other one-way valves may be used in the article of the present invention as long as they function as needed to prevent air from leaking out of the valve or the interior of the article, and these one-way valves may be constructed of various plastics, rubbers or other elastomeric materials known in the art.

Figure 5:
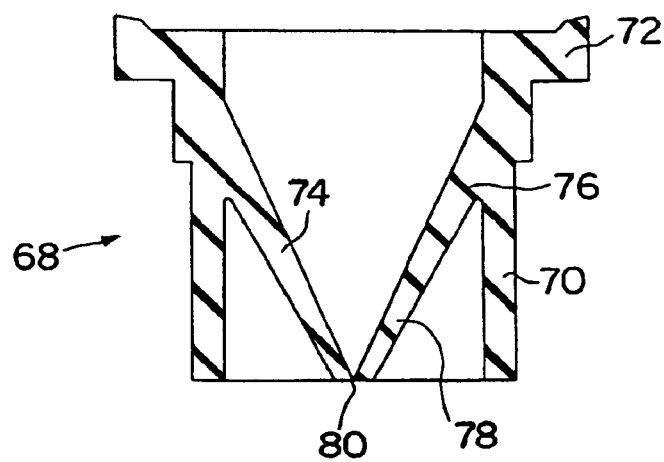
FIG. 5 is a more detailed view of the duckbill valve in the FIG. 4 assembly.

Although any desired one-way valve could be used on the exit nozzle 46 and although duckbill valves are a common type of one-way valves, a specific duckbill configuration is shown in FIG. 4 and in greater detail in FIG. 5. The duckbill structure 68 is preferably formed of an elastomeric silicone material and is molded with a cylindrical barrel 70 having a flange 72. Inside of the barrel 70 is the duckbill 74 that has an upper inlet end 76 molded around the inside circumference into the barrel 70. The walls or sides 78 of the duckbill 74 then taper down to form the straight line lower end with the duckbill slit 80. The duckbill functions in the conventional manner where inlet air pressure forces the duckbill slit 80 open to admit air while the air pressure inside of the ball squeezes the duckbill slit closed to prevent the leakage of air. Such a duckbill structure is commercially available from Vernay Laboratories, Inc. of Yellow Springs, Ohio. The valve can be adjusted to allow the pump to work in higher pressure atmospheres, such as tires. A small, lightweight pump used in smaller articles may have a one-way valve that is rated for pressures up to about 15 psi.

Figure 6:
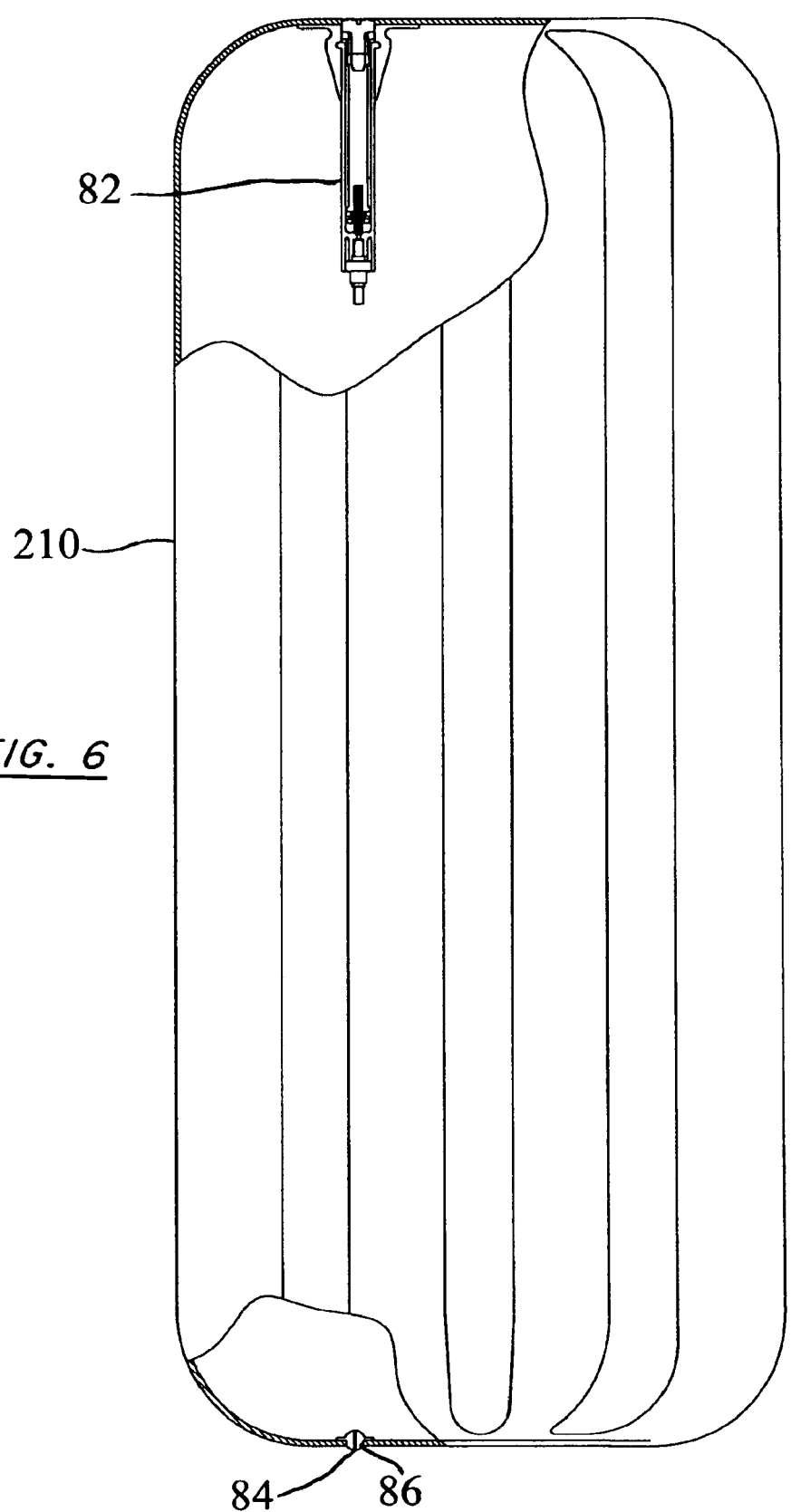
FIG. 6 is a cross-section view of an entire inflatable boat bumper or fender illustrating a pump on one side and a traditional inflation valve on the opposite side, and optionally including a counterweight.
Figure 23:
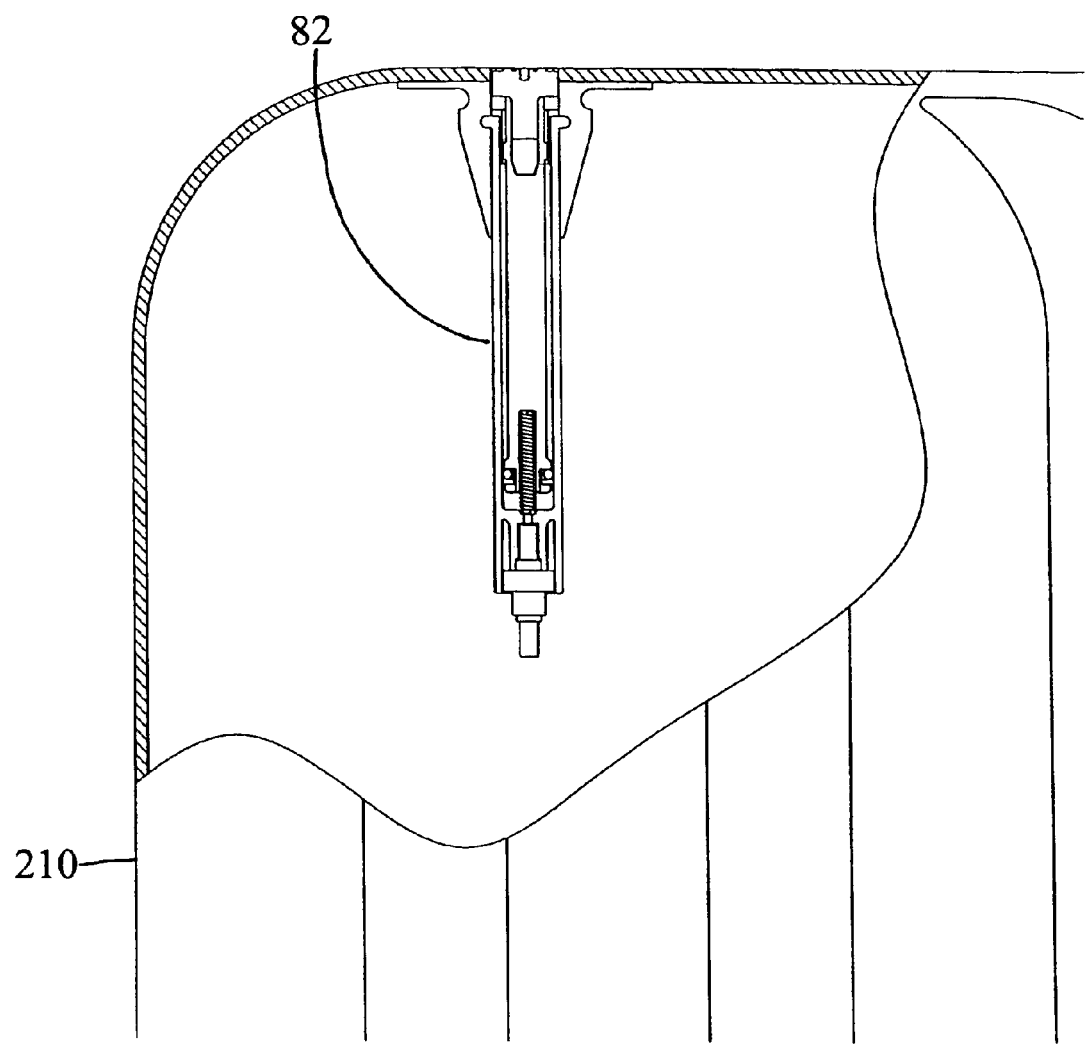
FIG. 23 is an enlarged view of the pump mechanism in the boat bumper or fender of FIG. 6.
Figure 24:
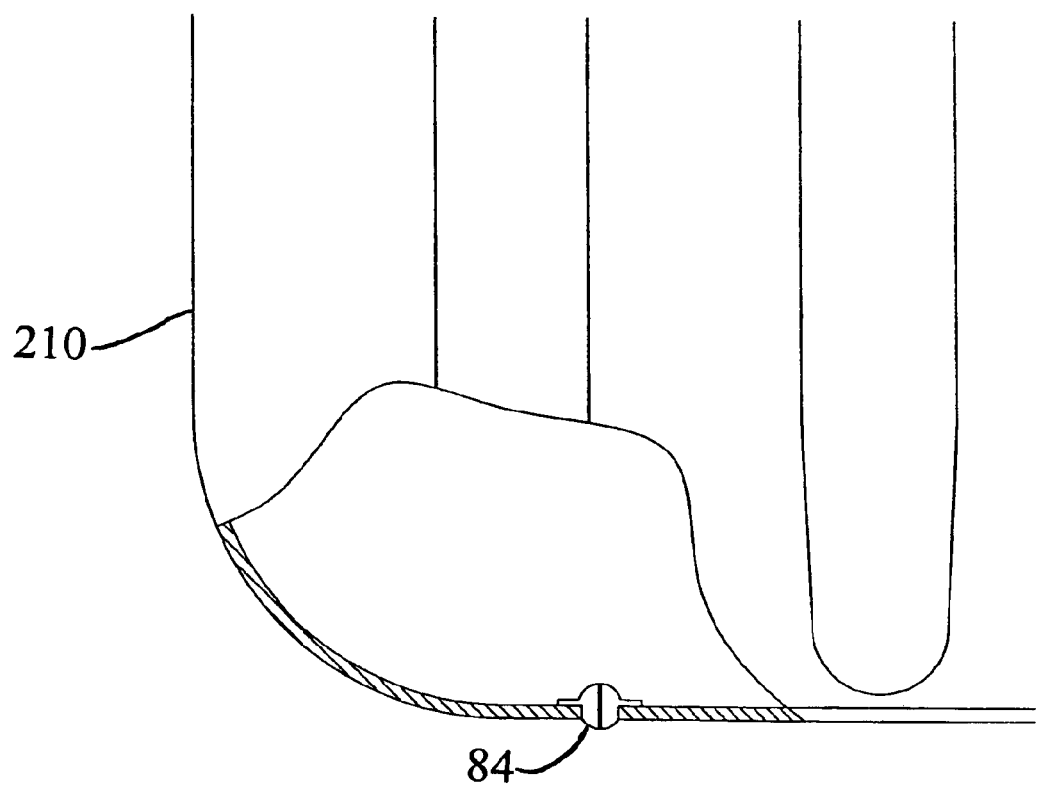
FIG. 24 is an enlarged view of the needle valve in the boat bumper or fender of FIG. 6.
Figure 25:
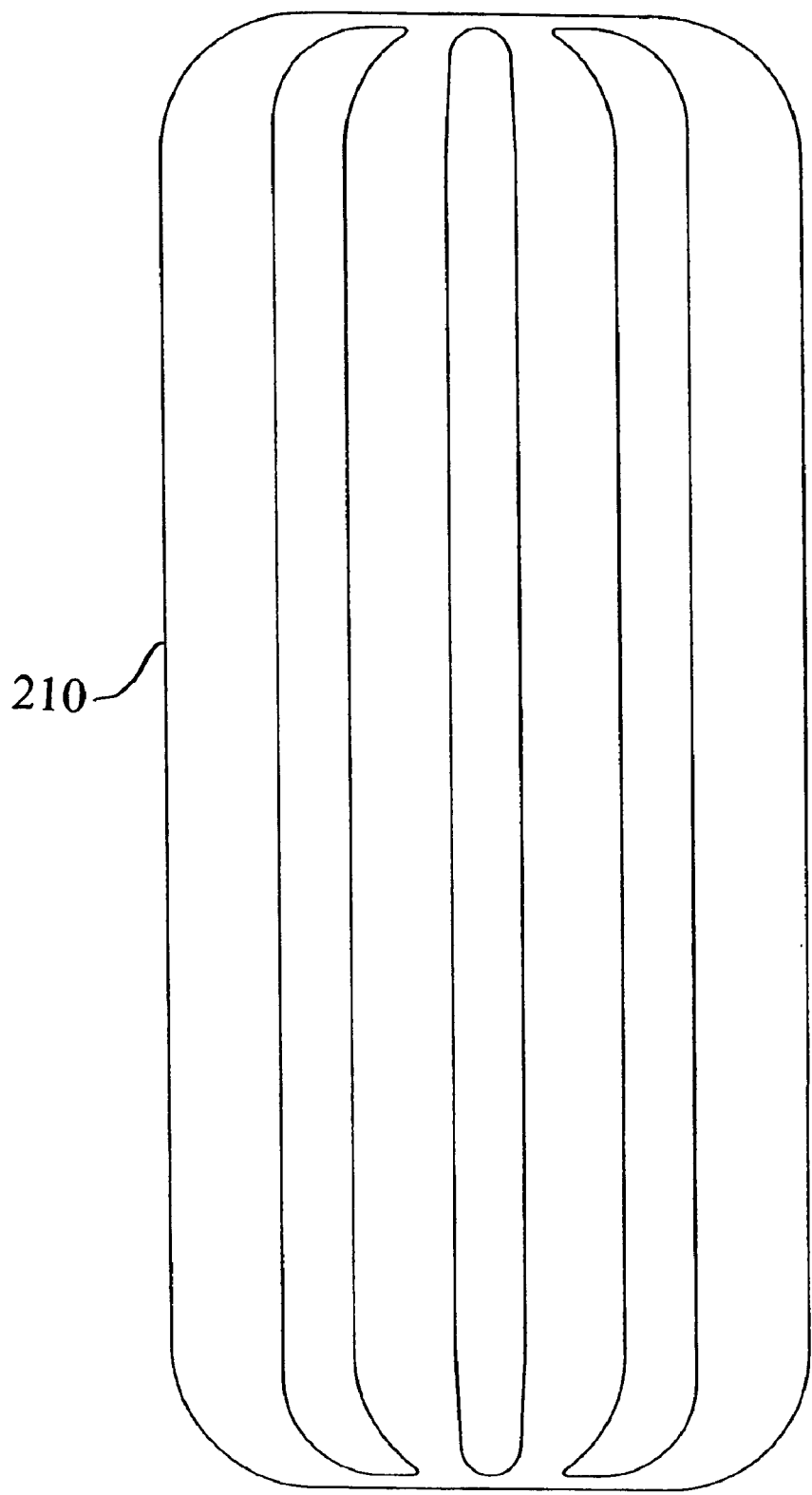
FIG. 25 is a side view of a preferred embodiment boat bumper or fender of the invention.

A pump assembly of the type described and illustrated in FIGS. 1 to 5 is preferably made primarily from plastics such as polystyrene, polyethylene, nylon, polycarbonate and combinations thereof, but it can be made of any appropriate material known in the art. In many types of articles the pump assembly is small and lightweight, preferably only about 5 to about 200 grams, more preferably about 20 to about 100 grams, although larger or smaller pumps are possible. Depending on the weight and function of the article, it may be desirable that a weight be added to the article structure to counterbalance the weight of the pump mechanism. In some articles, balance may not be a critical feature, and in other articles, the pump may be light enough not to impact the balance at all because the article is relatively heavy as compared to the pump. FIG. 6 illustrates a counterbalance arrangement wherein a pump mechanism generally designated 82 is on one side of an article 210, such as a boat bumper or fender, and a standard needle valve 84 is on the opposite side of the article. In this case, the material 86 forming the needle valve 84 may be weighted if necessary. Additional material can be added to the needle valve housing or the region surrounding the valve. Alternatively, a dense metal powder such as tungsten could be added to the rubber compound. If there is no second valve opening, a counterweight may be added in any appropriate position. FIGS. 23 and 24 are enlarged views of the pump mechanism 82 and needle valve 84 shown in the boat bumper or fender 210 of FIG. 6. FIG. 25 is a side view of a preferred embodiment boat bumper or fender 210 of the invention.

The description thus far and the drawing FIGS. 1 to 5 disclose a particular and one preferred pump arrangement. However, other pump arrangements can be used within the scope of the invention. FIGS. 7, 8 and 9 illustrate another type of pump located on the inside of the article and operable from outside. The pump comprises a rigid cylinder 88 attached to the carcass 90 of the ball. The piston 92 is hollow with a cap 94 on the top. The O-rings 96 form the seal between the piston 92 and the cylinder 88. Adjacent the top of the piston 92 are air intake holes 98 and an air outlet hole 100 is in the bottom of the piston. A flap valve 102 covers the hole 100 such that air flows into the piston 92 and out of the outlet hole 100 through the flap valve 102 to fill the cylinder 88 with air when the piston 92 is pulled up. In the bottom of the cylinder 88 is a hole 104 and a flap valve 106. When the piston 92 is pushed back down, the flap valve 102 closes and the flap valve 106 opens and the air in the cylinder 88 is forced through the hole 104 and flap valve 106 into the article. When the piston 92 is being pulled up, the flap valve 106 is forced closed. A spring 108 forces the piston 92 to the up or extended position and the piston is pushed down against the spring force. J-slots 110 on the piston 92 cooperate with the projections 112 on the cylinder to lock the piston in the down position. Therefore, the piston is turned to lock and unlock the piston such as by the use of a coin 114 in the slot 116.

Figure 10:
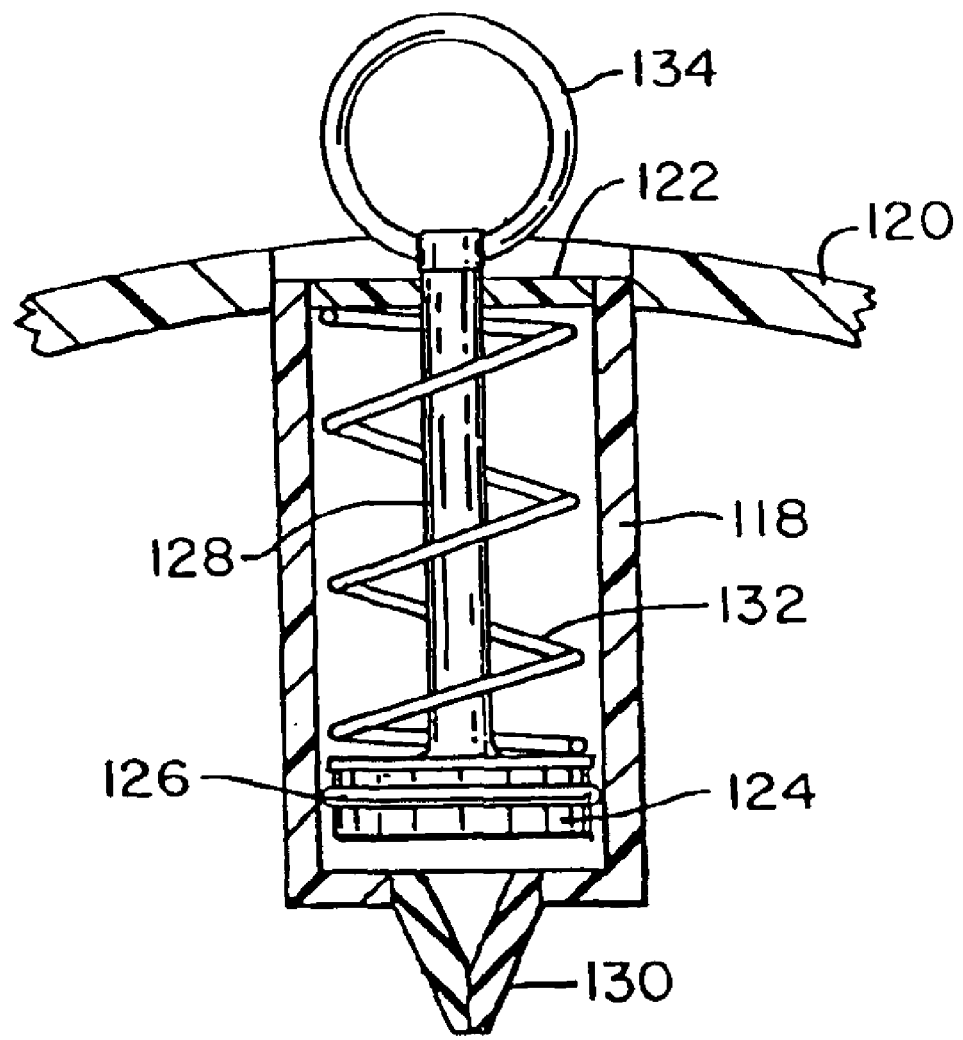
FIG. 10 illustrates a further pump variation.

Another variation of the invention is shown in FIG. 10. Generally shown is a cylinder 118 attached to the carcass 120 of the ball and a cap 122 on the cylinder. The actual layers of the carcass are not shown in this FIG. 10. Inside the cylinder is a piston 124 with an O-ring seal 126 and a piston rod 128. On the bottom of the cylinder is a one-way valve 130 of the duckbill-type. In this embodiment, the spring 132 forces the piston 124 and the piston rod 128 down into the cylinder so that the piston rod 128 is pulled up against the spring force and the spring forces the piston and piston rod down into the cylinder. Attached to the upper end of the piston rod is a flip-up pull ring 134.

Figure 12:
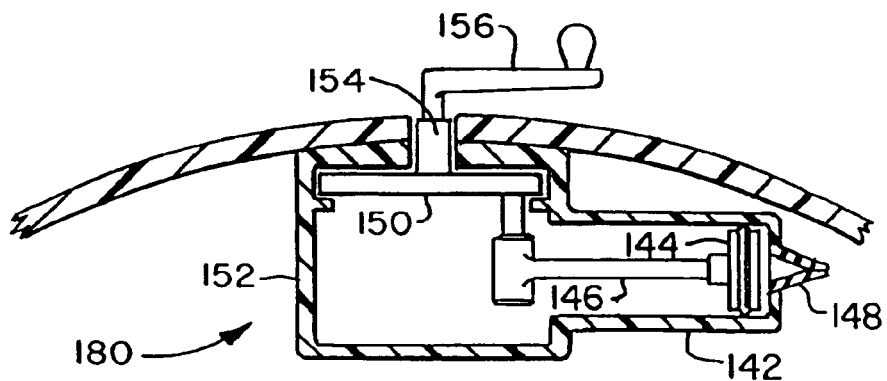
FIGS. 12 and 13 illustrate a pump embodiment which is operated by rotary motion.
Figure 13:
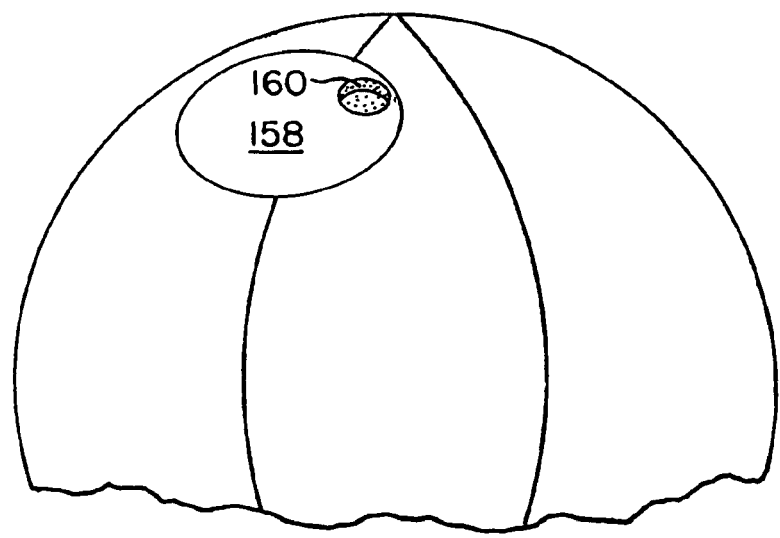

FIG. 12 illustrates another embodiment of the invention in which the pump generally designated 140 with a cylinder 142, a piston 144, a piston rod 146 and a duckbill valve 148 has the piston rod rotatably connected to the rotating disk or crank wheel 150. This disk 150 is rotatably mounted in the chamber 152 and a crank fitting 154 extends up through the carcass or inner layer of the article. The crank 156 is inserted into the fitting 154 for rotation of the disk 150 and the consequent operation of the pump. The related version of this embodiment shown in FIG. 13 has the rotating disk comparable to the disk 150, now designated 158, rotatably mounted on the surface of the article. The disk has a finger hole 160 so that the disk can be manually rotated with a finger inserted into the hole.

Figure 14:
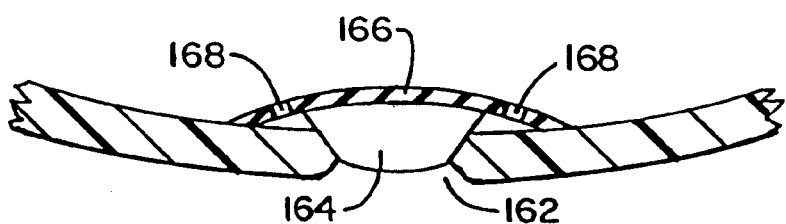
FIG. 14 shows an arrangement for releasing pressure from an inflated article.

Since the pressure in an inflated article can be too high through overinflation or a temperature increase, it is advisable to have a way to bleed pressure from the article when the conventional inflating needle is not available. One type of an arrangement is shown in FIG. 14 including a bleeding aperture 162 through the carcass of the article, a plug 164 in the aperture and an elastic cover 166 having holes 168 that normally keep the plug 164 tight and sealed in the aperture 162. The elastic cover 166 permits the plug 162 to be pushed open to bleed pressure through the holes 168 and the aperture 162.

Figure 15:
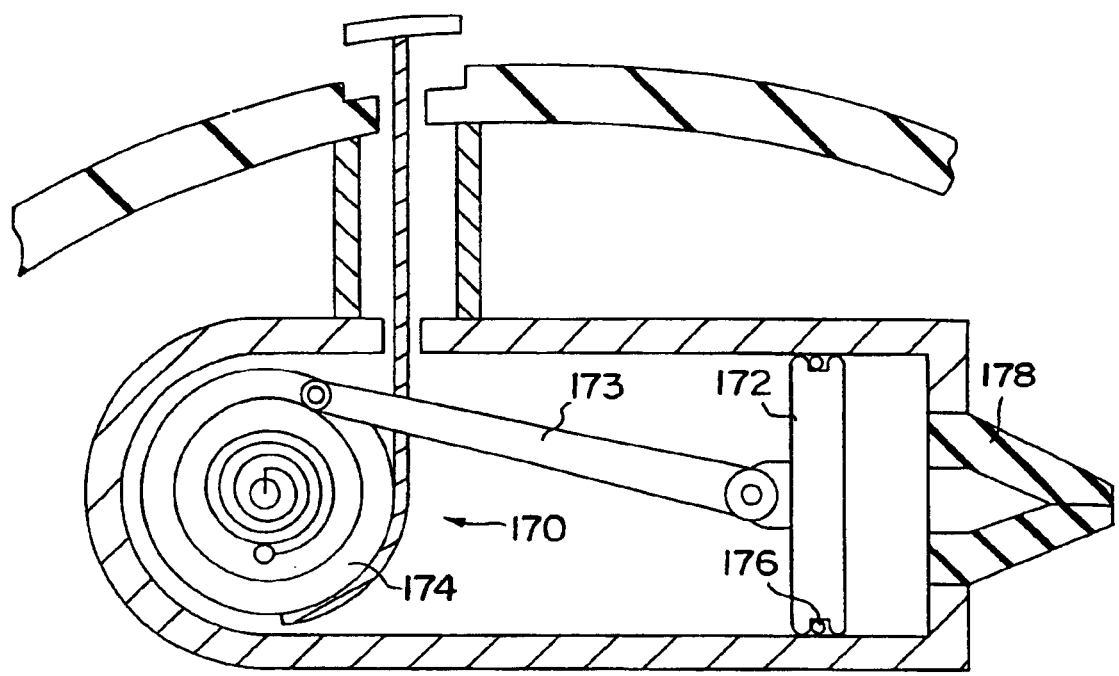
FIGS. 15 to 22 show other pump variations.

FIG. 15 represents a pump operated by a pull cord mechanism 170 with a piston 172 attached by the piston rod 173 to the drive wheel 174 which is ratcheted and spring loaded and which operates in the same well-known manner as the starter of a lawn mower. The piston 172 is provided with an O-ring seal 176 which is the same as the O-ring seal shown in FIG. 1 which permits air flow past the piston in one direction but not the other. The cylinder is provided with the one-way flow valve 178 of the duckbill type for permitting flow into the article and preventing flow back out.

Figure 16:
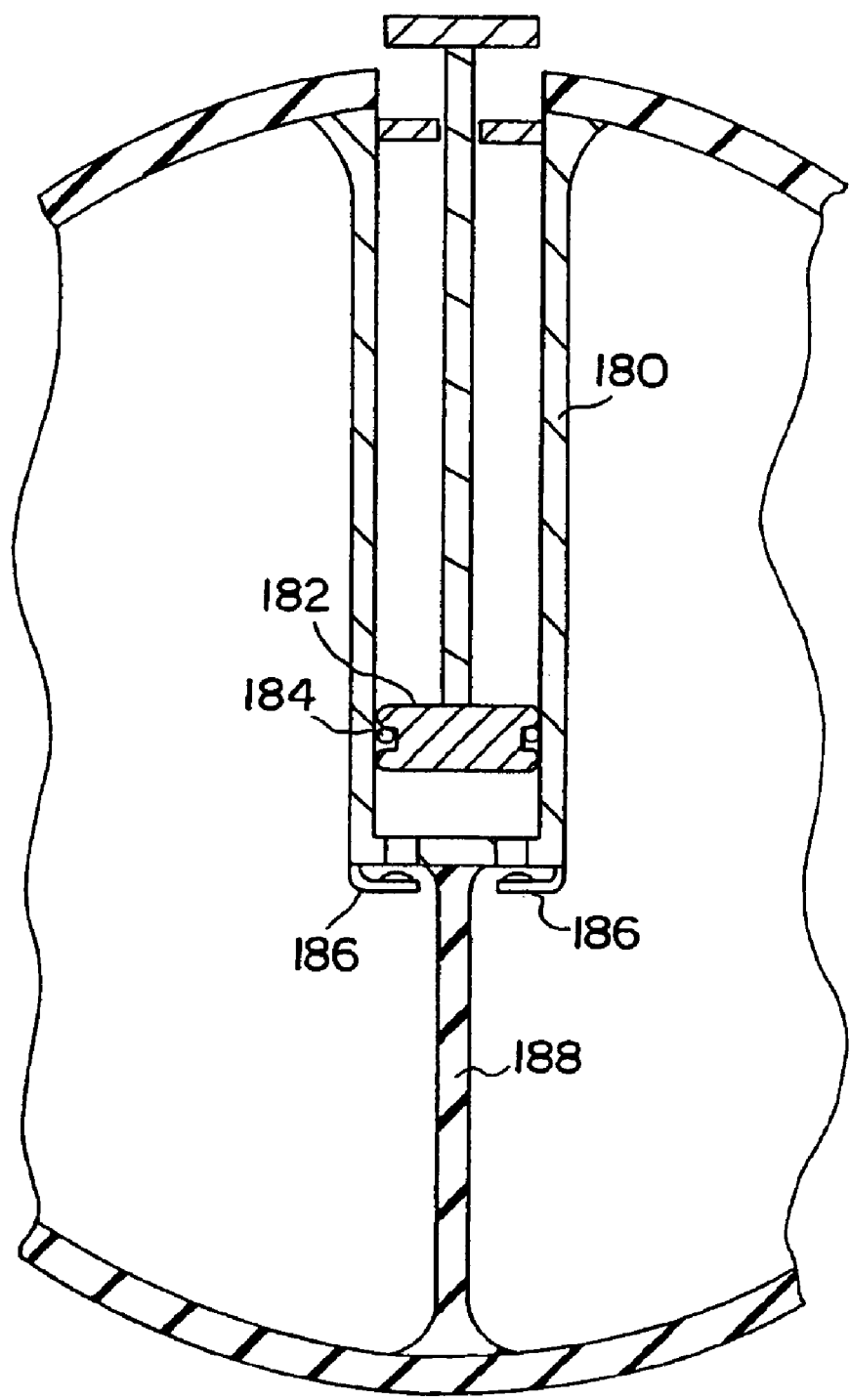

FIG. 16 is another variation of a pump with a cylinder 180, a piston 182 with a one-way flow O-ring arrangement 184 and one-way flap valves 186 for the flow of air into the ball from the pump. Further shown is a pump cylinder support 188 that is a flexible or soft material such as rubber to support and minimize movement of the pump.

Figure 17:
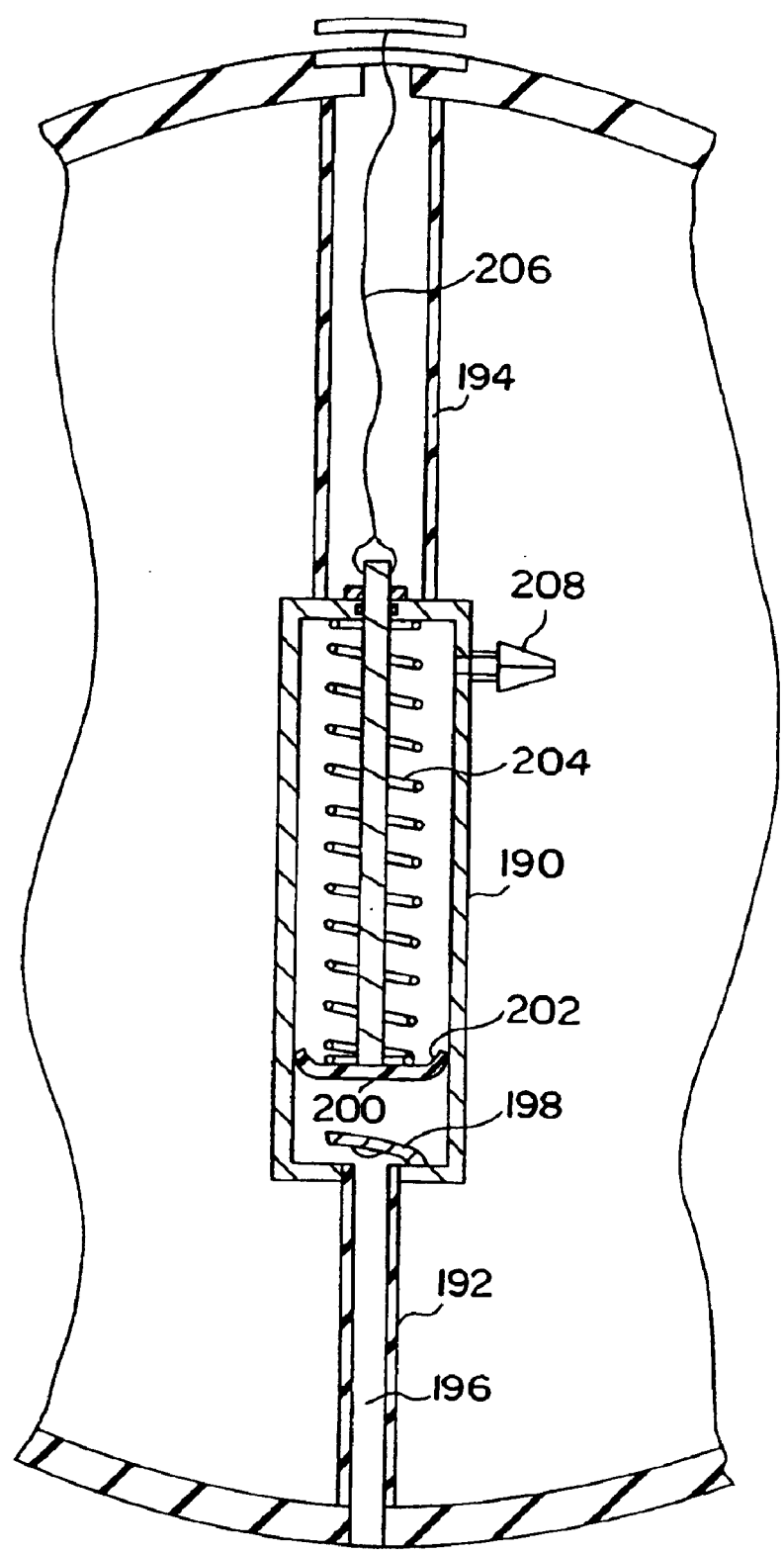

FIG. 17 is a pump variation in which the pump is operated by a pull string or cord. The pump cylinder 190 is supported in the ball by the flexible supports 192 and 194. Air is admitted into the cylinder 190 through the bore 196 in the support 192 and through the one-way flap valve 198. The piston 200 has a skirt 202 around the periphery that functions as a one-way check valve. This permits flow past the piston as it moves down and prevents bypass flow as the piston is pulled up. The spring 204 forces the piston down and the string 206 is used to pull the piston up against the spring force to pump air out into the ball through the duckbill outlet valve 208.

Figure 18:
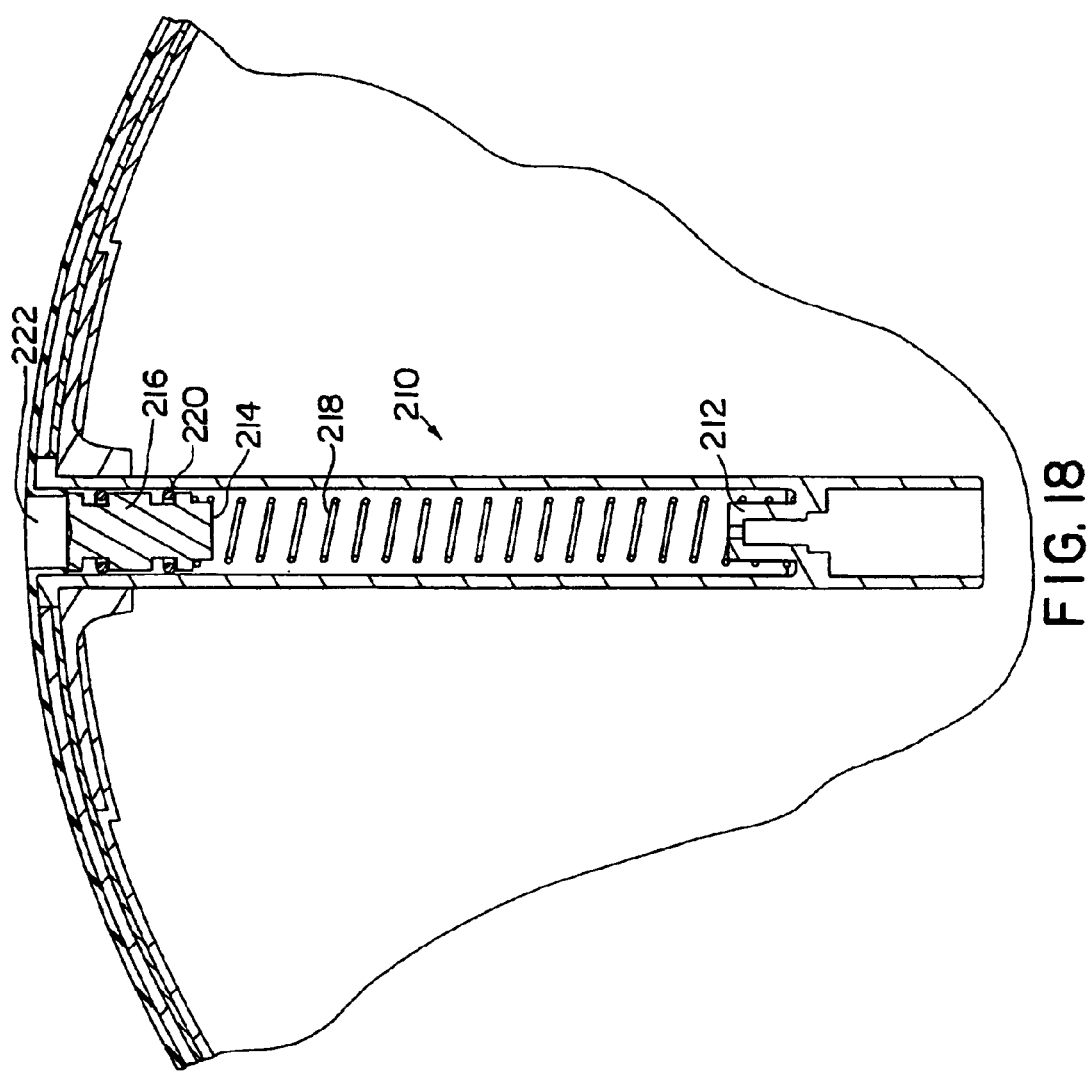

FIG. 18 shows another pump variation 210 that would include a duckbill valve at the lower end such as the duckbill valve shown in FIGS. 4 and 5. The extensions 212 at the bottom and 214 on the piston 216 keep the spring 218 centered and prevent the spring from rubbing excessively on the cylinder wall. These extensions also function as a stop when the spring is compressed and these extensions engage each other. In this embodiment, the piston 216, which again has the one-way flow O-rings 220, is operated by inserting a separate push rod down through the opening 222 to push the piston down against the spring force.

Figure 19:
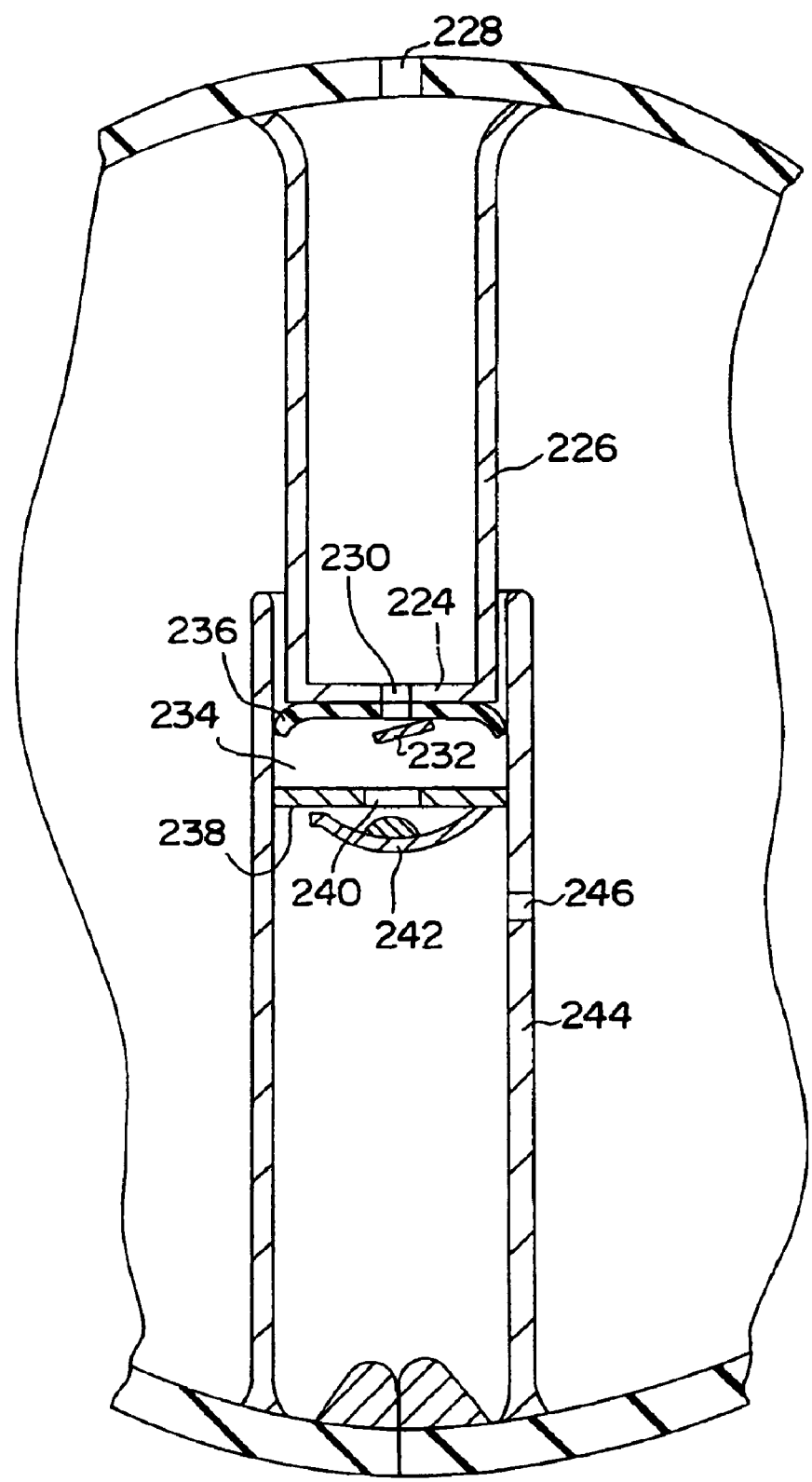

FIG. 19 is a pump variation that comprises a piston 224 which forms the end of the chamber 226 that is attached to the carcass or inner layer of the article, such a ball. Air is admitted into the chamber 226 through the hole 228 and flows out of the chamber 226 through the hole 230 in the piston and through the one-way flap valve 232 into the cylinder 234. The skirt or micro-cup valve 236 forms the seal between the piston and the wall of the cylinder 234. The cylinder 234 is closed at the end 238 that has an opening 240 and a one-way flap valve 242. The cylinder support tube 244 has an opening 246 for air flow. To operate this pump, the top of the article in the area of the hole 228 is pressed down which forces the chamber 226 down. This forces the piston 224 down in the cylinder 234 and closes the flap valve 232 to force air from the cylinder 234 through the flap valve 242 and out the hole 246 into the article. The flap valve 242 prevents the air from flowing back out of the article. Also, the flap valve prevents flow down around the skirt 236 and out of the article.

Figure 20:
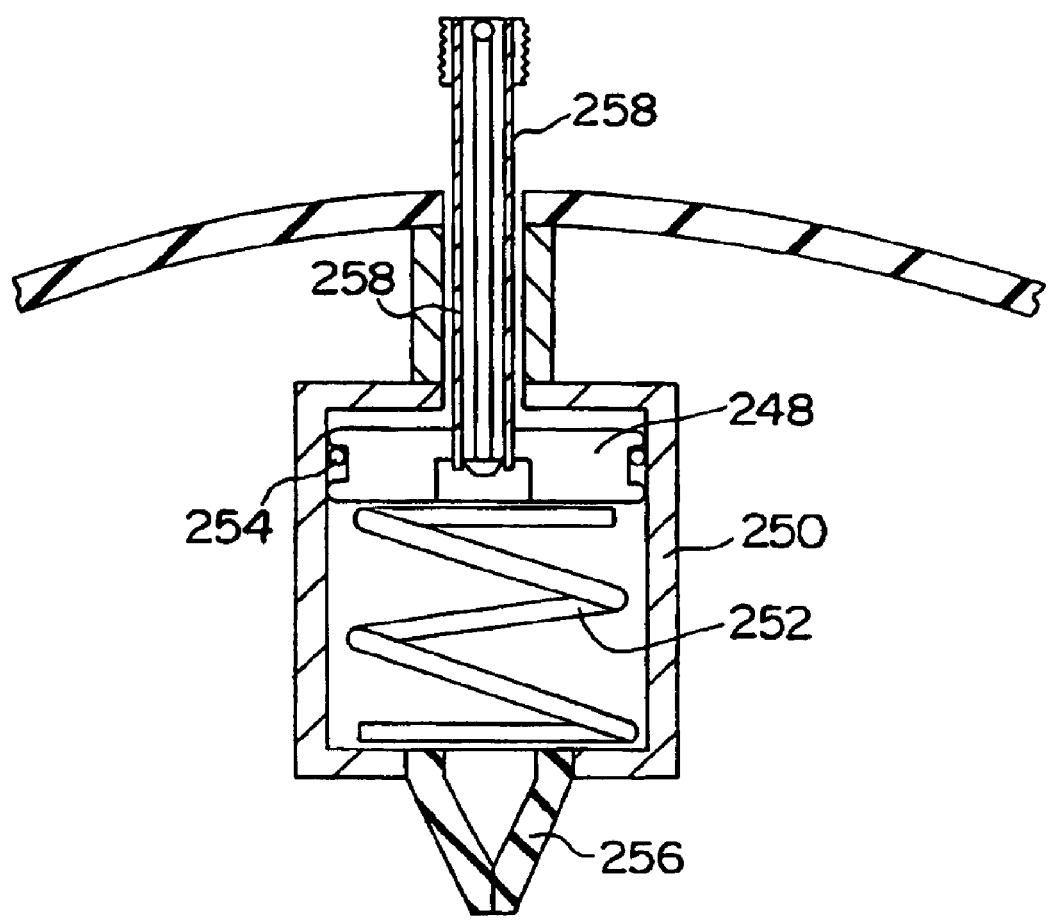

FIG. 20 illustrates an arrangement that can function in one of two ways. This comprises a piston 248 in the cylinder 250 with the piston being forced up by the spring 252. The piston is once again provided with the one-way flow O-ring arrangement 254 and the cylinder has the one-way flow duckbill 256. In this embodiment, the piston rod comprises a valve stem 258 the same as used on an automobile or bicycle tire. This valve stem 258 can be used to mechanically reciprocate the piston by pushing down on the valve stem. Means not shown would be used to lock the valve stem down. In addition to being able to inflate the article by mechanically moving the piston, the article can alternatively be inflated with a tire pump if necessary. The tire pump is merely attached in the normal manner to the valve stem 258 and used to pump up the article just like an auto or bike tire.

Figure 21:
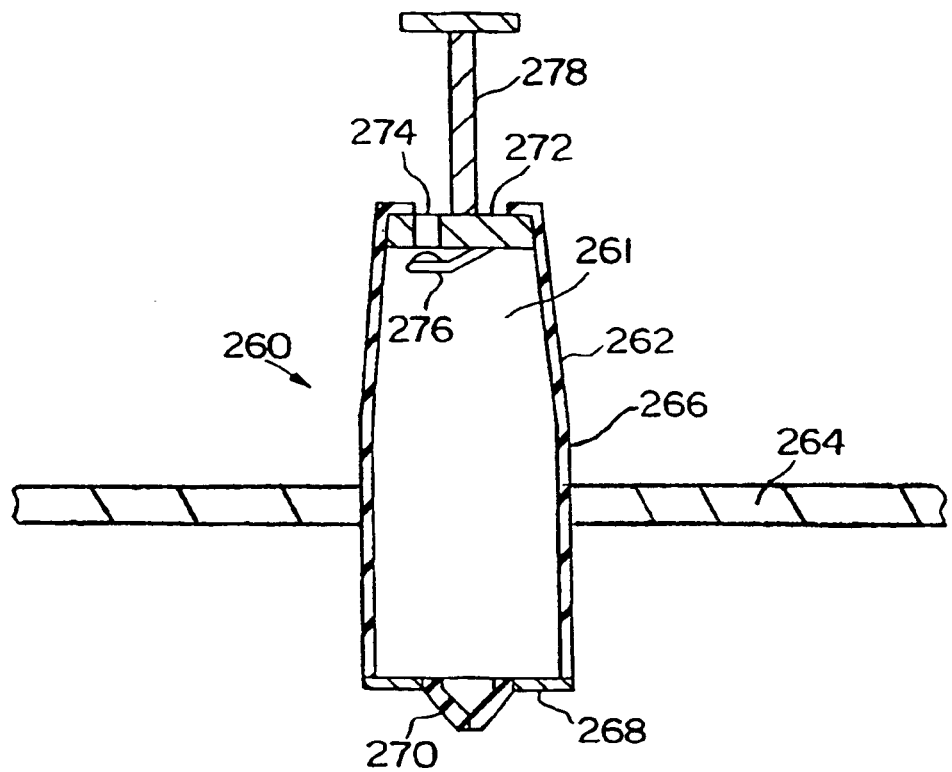
Figure 22:
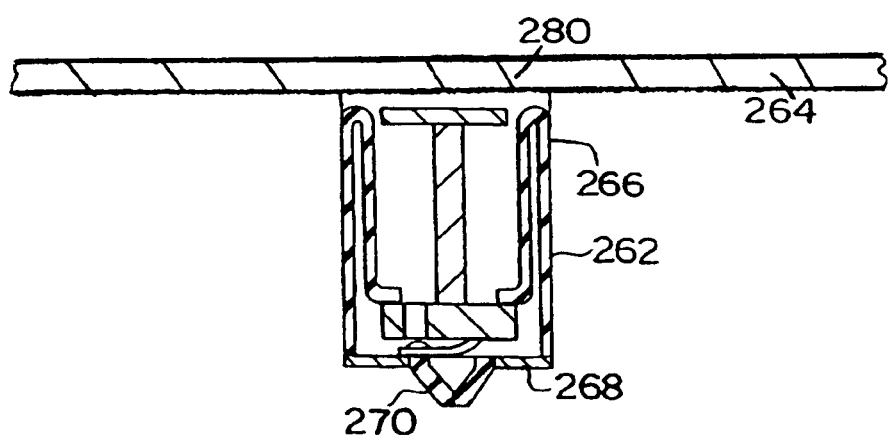

FIGS. 21 and 22 illustrate a different type of pump 260 which has a cylinder 261 formed from a flexible bladder 262. The flexible bladder, which may be rubber or similar material, is sealed to the article carcass 264 at 266, and closed at the bottom end by the round plate 268 which contains the duckbill valve 270. The bladder 262 is attached at the top to the piston 272 having an opening 274 to the atmosphere and a flap valve 276. When the piston 272 is pushed down by the piston rod 278 from the position shown in FIG. 21, the flap valve 276 closes and the air is forced out of the bladder 262 through the duckbill valve 270 into the article. As the piston 272 is pushed down, the bladder flexes and the top part follows the piston down inside of the bottom part into the position shown in FIG. 22. When the piston is pulled up, the flap valve 276 opens and the bladder fills with air. A flap, preferably of the same material as the outer layer, that may be held in place by Velcro™ or other fastening system would cover over the article opening 280.

This invention has been described with reference to the preferred embodiments. Modifications and alterations will occur to others upon reading and understanding the preceding detailed description. It is intended that the invention be construed as including all such alterations and modifications insofar as they come within the scope of the claims and the equivalents thereof.

What is claimed is:

1. An inflatable article comprising at least one internal pump, wherein the at least one pump includes means for actuating the pump and wherein the pump includes means for pumping ambient air into the article and means for preventing the pumped air from escaping out of the article, and further wherein the pump is essentially flush with or slightly below the surface of the article when not in use.

2. The inflatable article of claim 1, wherein the article is piece of sports equipment, a recreational device, a medical device, or a toy.

3. An inflatable sports ball comprising an internal pump, said pump including a cylinder having an air outlet into said sports ball, a one-way valve attached to said air outlet permitting air flow from said cylinder into said sports ball and preventing air flow from said sports ball back into said cylinder, means in said cylinder operable to draw ambient air from outside said sports ball into said cylinder and to force said drawn ambient air from said cylinder through said one-way valve into said sports ball and further including means for actuating said pump from outside said sports ball.

4. The inflatable sports ball of claim 3, wherein the at least one pump is small and lightweight and weighs about 5 to about 200 grams.

5. The inflatable sports ball of claim 3, wherein the at least one pump is slightly below the surface of the sports ball when not in use.

6. The inflatable sports ball of claim 3, further including means inside the sports ball to counterbalance the weight of the at least one internal pump.

7. The inflatable sports ball of claim 3, further including means to bleed air from or decrease the pressure of the sports ball.

8. An inflatable article comprising an internal pump, said pump including a cylinder having an air outlet into said article, a one-way valve attached to said air outlet permitting air flow from said cylinder into said article and preventing air flow from said article back into said cylinder, means in said cylinder operable to draw ambient air from outside said article into said cylinder and to force said drawn ambient air from said cylinder through said one-way valve into said article and further including means for actuating said pump from outside said article.

9. The inflatable article of claim 8, wherein the pump is small and lightweight and weighs about 5 to about 200 grams.

10. The inflatable article of claim 8, wherein the article is piece of sports equipment, a recreational device, a medical device, or a toy.

11. The inflatable article of claim 8, wherein said pump is slightly below the surface of the article when not in use.

12. The inflatable article of claim 8, further including means inside the article to counterbalance the weight of the at least one internal pump.

13. The inflatable article of claim 8, further including means to bleed air from or decrease the pressure of the article.

* * * * *